(12) United States Patent
Wieland et al.

(10) Patent No.: US 9,091,364 B2
(45) Date of Patent: Jul. 28, 2015

(54) SLIDE VALVE HAVING A HOUSING AND A SLIDE ELEMENT GUIDED WITHIN THE HOUSING

(75) Inventors: Robert Wieland, Sulzbach (DE); Rolf Bald, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 610 days.

(21) Appl. No.: 13/438,597

(22) Filed: Apr. 3, 2012

(65) Prior Publication Data
US 2012/0326062 A1 Dec. 27, 2012

(30) Foreign Application Priority Data
Apr. 6, 2011 (DE) .......................... 10 2011 006 855

(51) Int. Cl.
*F16K 31/06* (2006.01)
*F16K 11/07* (2006.01)
*F16H 61/02* (2006.01)

(52) U.S. Cl.
CPC .............. *F16K 31/0613* (2013.01); *F16K 11/07* (2013.01); *F16H 2061/0253* (2013.01)

(58) Field of Classification Search
CPC .................................................. F16K 31/0613
USPC ............ 137/625.25, 625.65, 625.67, 625.68, 137/625.69
See application file for complete search history.

(56) References Cited

U.S. PATENT DOCUMENTS

| 4,388,949 A * | 6/1983 | Bonney ..................... 137/625.17 |
| 7,137,411 B2 * | 11/2006 | Golovatai-Schmidt et al. ........................ 137/625.65 |
| 2010/0124779 A1 * | 5/2010 | Rainer et al. ................ 435/289.1 |

* cited by examiner

*Primary Examiner* — John K Fristoe, Jr.
*Assistant Examiner* — Kelsey Rohman
(74) *Attorney, Agent, or Firm* — Kenyon & Kenyon LLP (57) ABSTRACT

A slide valve having a housing and a slide element guided within the housing, at least two hydraulic connections being present on the housing, and at least one of the hydraulic connections communicating hydraulically with at least one control port in a cylindrical guide surface that guides the slide element, the control port extending only over a limited distance in the circumferential direction of the guide surface and cooperating with a control edge of the slide element assigned thereto, the slide element having an essentially cylindrical outer contour and at least one end face, and the slide element being produced by injection molding, and at least one injection point being configured on the end face.

10 Claims, 10 Drawing Sheets

SLIDE VALVE HAVING A HOUSING AND A SLIDE ELEMENT GUIDED WITHIN THE HOUSING

RELATED APPLICATION INFORMATION

The present application claims priority to and the benefit of German patent application no. 10 2011 006 855.4, which was filed in Germany on Apr. 6, 2011, the disclosure of which is incorporated herein by reference.

FIELD OF THE INVENTION

The present invention relates to a slide valve, as well as to a method in accordance with the description herein.

BACKGROUND INFORMATION

In modern automatic transmissions in motor vehicles, hydraulically actuated clutches are used for gear shifting. To enable these gearshift operations to be carried out imperceptibly to the driver, the utmost precision must be used to adjust the hydraulic pressure in the clutches in accordance with predefined pressure ramps. Electromagnetically actuated pressure control valves are used to adjust these pressure ramps.

SUMMARY OF THE INVENTION

It is, therefore, an object of the exemplary embodiments and/or exemplary methods of the present invention to provide a slide valve according to the description herein, as well as a method according to the description herein. Advantageous further refinements are delineated in the dependent claims. Important features of the exemplary embodiments and/or exemplary methods of the present invention are set forth in the following description and in the drawings, the features important to the exemplary embodiments and/or exemplary methods of the present invention being able to be considered, both alone, as well as in different combinations, without having to refer explicitly thereto again.

It is an advantage of the exemplary embodiments and/or exemplary methods of the present invention that a slide element of a slide valve may be produced cost-effectively by injection molding, it being possible to maintain low dimensional tolerances of the slide element surfaces important to functioning. Any gaps that arise and resultant leakage flows of a hydraulic fluid between the slide element and a cylindrical guide surface of a slide housing ("housing") remain relatively insignificant.

The slide valve according to the present invention features a housing having at least two hydraulic connections. At least one of the hydraulic connections communicates hydraulically with at least one control port in a cylindrical guide surface of the housing that guides the slide element. In particular, the control port extends only over a limited distance in the circumferential direction of the guide surface. The control port cooperates with a control edge of the slide element assigned thereto. The slide element has an essentially cylindrical outer contour and at least one end face, and is produced by injection molding. At least one injection point (sprue) required for the injection molding is configured on the end face of the slide element. At least two injection points may be configured on both end faces of the slide element, respectively.

More than one injection point may be configured on the end face of the slide element, which may be symmetrically to a longitudinal axis of the slide element, respectively of the slide valve. The symmetry achieved in the injection molding process makes possible an especially uniform demolding of the slide element, and thus excellent geometrical accuracy.

This eliminates the need for postprocessing operations, such as machining.

It is provided, in particular, that the slide valve encompass means for limiting a rotation of the slide element relative to the housing. Combining the property of the at least one control port, whereby it extends only over a limited distance in the circumferential direction of the guide surface, with the means for limiting rotation, makes it possible to ensure that the control port(s) is/are only able to cooperate with the designated radial portions of the slide element. Thus, it suffices when particular precision is used only in the injection molding of these radial portions of the slide element, as will be explained further below. Any potential leakage may be thereby minimized.

One embodiment of the slide valve provides that the means for limiting the rotation encompass at least one guide device in accordance with the tongue and groove principle, a radial angle of the groove being equal to or greater than a radial angle of the tongue guided in the groove. Such a guide device, which functions in accordance with the tongue and groove principle, may be manufactured very simply and to adequate precision. Costs may be thereby saved and the fatigue strength of the slide valve enhanced.

In particular, the guide device design may provide for the slide element to feature at least one axially extending tongue, and for the guide surface, respectively the housing to feature at least one axially extending groove. The tongue may be smaller in axial length than the slide element. This configuration is particularly useful when, at the same time, each groove is a radial portion of an axially extending hydraulic channel ("overflow channel"). Thus, the functions of the groove and of the overflow channel are advantageously combined. The design of the slide valve is thereby simplified, making it possible to save costs.

One embodiment of the present invention provides that the groove be formed at least at one of two axially extending bounding surfaces by an axially extending rib of the guide surface, respectively of the housing. Additional design options are thereby derived for the overflow channel(s). This makes it possible to obtain an adequate cross section of the overflow channels and, at the same time, limit a rotation of the slide element relative to the housing.

Another embodiment of the present invention provides that the slide element feature two approximately 180° mutually offset tongues, the first tongue cooperating with the corresponding groove to limit a clockwise rotation of the slide element, and the second tongue cooperating with the corresponding groove to limit a counterclockwise rotation of the slide element. Thus, once again, other structural design options for realizing the overflow channels, on the one hand, and the groove, on the other hand, are described. For example, the longitudinal rib may be configured within the overflow channel, whereby the overflow channel is subdivided into at least two radial regions. Thus, the tongue configured on the slide element may glide by a bounding surface axially along the rib, the other respective axial bounding surface of the tongue not featuring any limit stop. Thus, using at least two approximately 180° mutually radially offset tongues configured on the slide element, one of the tongues is configured for acting on one direction of rotation, respectively, so that, in sum, both directions of rotation are provided for. This means that the radial play of the slide element in the groove may be kept relatively small. The precision of the slide valve according to the present invention may be thereby enhanced. The tongues may be radially configured at an approximately 90° angle relative to the control ports of the housing. It is noted that the present designation "clockwise direction" is only for comparison purposes and does not connote a requisite direction of rotation.

The slide valve is very inexpensive to manufacture when the slide element and/or the guide surface, respectively the housing are fabricated from a high-strength or reinforced plastic and/or from a fiberglass reinforced plastic. This makes it possible to attain an ease of manufacture, minimal contraction, a low rate of wear, adequate insensitivity to a hydraulic fluid that is used, and, in each case, desired thermal properties.

Due to the stringent requirements for the operating temperatures—for example, up to 150° C.—and the mechanical strength—for example, acting pressures of up to 20 bar—reinforced plastics having a high temperature resistance and a high resistance to the hydraulic oil used are particularly advantageous. The reinforcing fibers may be glass fibers, carbon fibers or other types of fibers, for example organic fibers, such as aromatic polyamides. Alternatively or additionally, inorganic filler material having an acicular, plate-like or spherical shape may be used.

The fibrous additives result in a relatively pronounced anisotropy of the slide element properties that, in particular, are conditional upon the geometry and/or the position of the injection points. Nevertheless, the present invention makes it possible for the slide element of the slide valve to be manufactured with adequate precision and small gap dimensions in the injection molding process.

A method is also provided for producing the slide valve, the slide element being manufactured by injection molding, and the slide element being injection-molded using at least one injection point on at least one end face of the slide element. At least two injection points may be configured at both end faces of the slide element, respectively. The slide element, injection-molded in this manner, thereby features an especially uniform and symmetrical shape having optimal roundness. It is possible to effectively approach a cylindrical shape, in particular at those radial portions of the slide element that cooperate with the control ports. This applies, in particular, to fiberglass reinforced plastics where, generally, the strength is greater and the thermal expansion coefficient is smaller. This makes it possible to improve the functioning of the slide valve and to minimize leakage.

In a first embodiment for that purpose, the slide element is injection-molded using at least two casting molds of an injection mold, the first casting mold being designed as a hollow cylindrical body, and the second casting mold as a punch that axially bounds the hollow cylindrical body. This embodiment is especially suited for those slide valves whose slide element has a comparatively small axial length. The slide element produced by injection molding may be advantageously axially demolded from the particular injection mold. The advantage is that the slide element may be designed to be radially symmetric, no axially extending binding seams being formed. In a second embodiment for that purpose, the slide element is injection-molded using at least three casting molds of an injection mold, the first and the second casting mold being designed as two elements of an axially cut hollow cylindrical body ("shape-forming cavity"), and the third casting mold as a punch that axially bounds the hollow cylindrical body. Thus, those slide elements having a comparatively long axial length may also be produced. For example, a first and a second part of the mold tool correspond to the axially cut halves of the hollow body. Thus, in some instances, 180° mutually radially offset burs may form on the slide element.

Another embodiment of the method provides that the slide element be injection-molded using two injection points configured symmetrically at the axial end face thereof. The two injection points may be radially adjacent to those portions of the peripheral surface of the slide element that cooperate with the control ports. This is particularly advantageous when a particular hydraulic connection of the slide valve features a pair of 180° mutually radially offset control ports. This enables the slide element to operate very precisely.

In particular, it is provided that burs forming during injection molding of the slide element on the peripheral surface thereof are formed outside of a region of the at least one control port. Together with the arrangements according to the exemplary embodiments and/or exemplary methods of the present invention for limiting a rotation of the slide element relative to the housing, it is achieved that the control ports of the housing cooperate only with the very precisely produced radial portions of the slide element, a contact with the burs of the slide element being thereby avoided.

Exemplary specific embodiments of the present invention are clarified in the following with reference to the drawing.

DETAILED DESCRIPTION

The same reference numerals are used for functionally equivalent elements and quantities in all of the figures, even for different specific embodiments.

Figure 1:
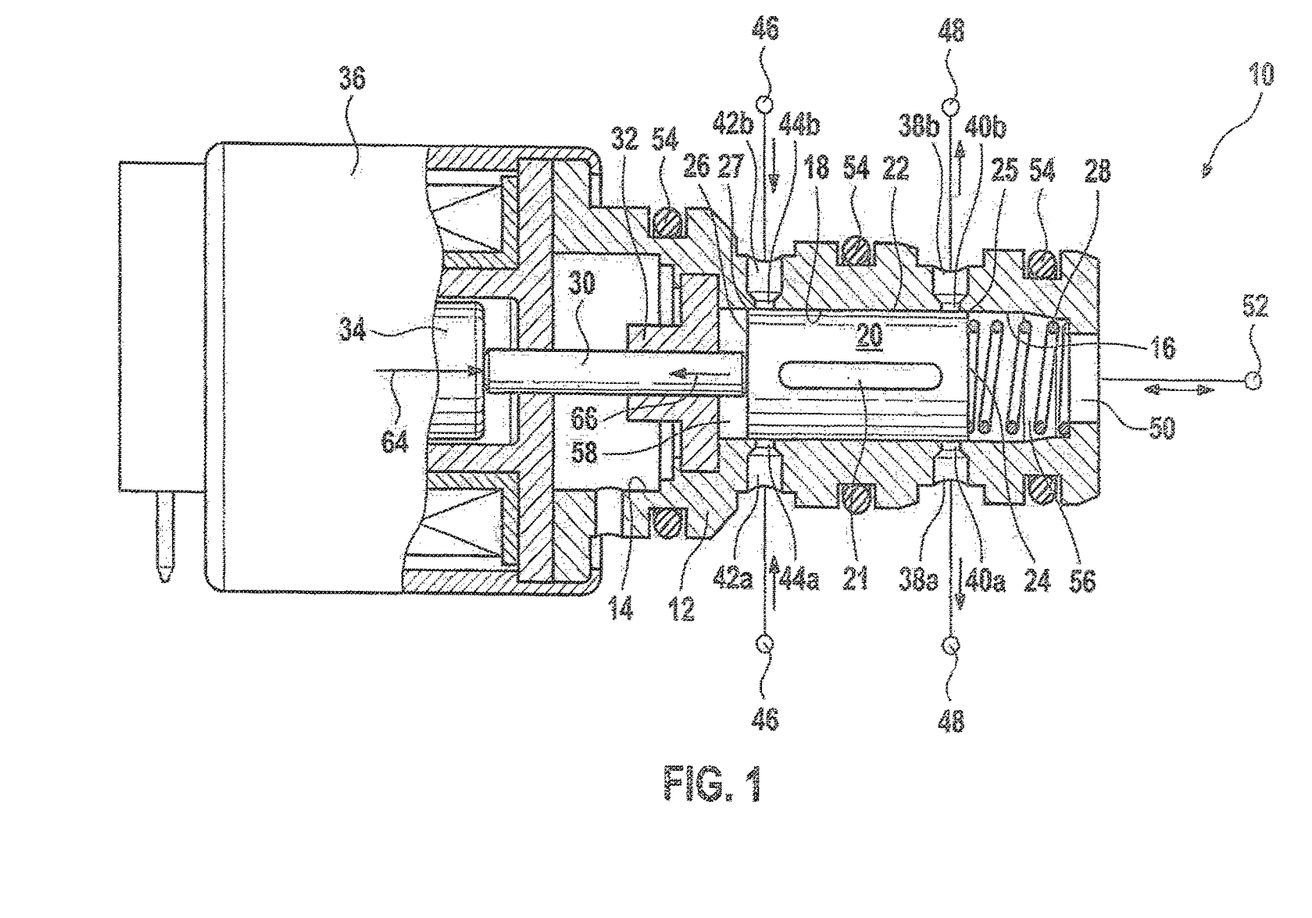
FIG. 1 shows a slide valve in a first specific embodiment in a part-sectional view.

FIG. 1 shows a slide valve 10 in a part-sectional view. In the present case, slide valve 10 is designed as a pressure regulating valve. It encompasses a housing 12 that has an axially stepped outer contour. A stepped bore 14 featuring a guide portion 16 having a constant diameter is provided in housing 12 and extends in the longitudinal direction thereof. Guide portion 16 has a cylindrical guide surface 18.

Configured in guide portion 16 of stepped bore 14 is a cylindrical slide element 20 that is guided by a guide surface 18. Slide element 20 has a peripheral surface 22 and, in the present case, two axially extending tongues 21, of which only one is visible in the drawing. In addition, slide element 20 has a right end face 24 in FIG. 1 and a left end face 26 in FIG. 1. A control edge 25 is configured between end face 24 and peripheral surface 22, and a control edge 27 is configured between end face 26 and peripheral surface 22. Thus, both control edges 25 and 27 extend radially peripherally, similarly to peripheral surface 22.

A compression spring 28 rests against right end face 24 in FIG. 1, and the other end thereof is braced against a step of stepped bore 14 in housing 12. A coupling pin 30 acts centrically on left end face 26 of slide element 20 in FIG. 1 and is guided in a fluid-tight manner in a guide piece 32. Thus, the center of end face 26 forms a functional surface for coupling pin 30. An armature 34 of an electromagnetic actuating device 36 acts on the end of coupling pin 30 distal from slide element 20. This electromagnetic actuating device 36 is flanged to housing 12 of slide valve 10.

In the area of the right end of slide element 20 in FIG. 1, two mutually opposing, radially extending channels 38a and 38b penetrating housing 12 are provided in the region of guide portion 16. The outlet of particular channel 38a, respectively 38b leading to guide surface 18 forms a control port 40a, respectively 40b. Analogously, a pair of mutually opposing, radially extending channels 42a and 42b penetrating housing 12 are provided in the area of the left end of slide element 20 in FIG. 1. The outlets thereof leading to guide surface 18 form control ports 44a and 44b. In the axial position of slide element 20 shown in FIG. 1, control ports 40a, 40b, 44a and 44b are sealed.

The two channels 42a and 42b communicate with a supply connection 46, which, in turn, communicates with a pressure side of a hydraulic pump (not shown). The two channels 38a and 38b communicate with a return connection 48, which, in turn, communicates with a low-pressure region of the hydraulic pump. At the right end in FIG. 1, housing 12 has a pressure-regulating port 50 that communicates with a control connection 52. If slide valve 10 is installed in an automatic transmission of a motor vehicle, for example, in order to actuate clutches for gear shifting, a hydraulic clutch actuation would take place via control connection 52, the pressure acting on the clutch via a hydraulic amplifier.

Figure 3A:
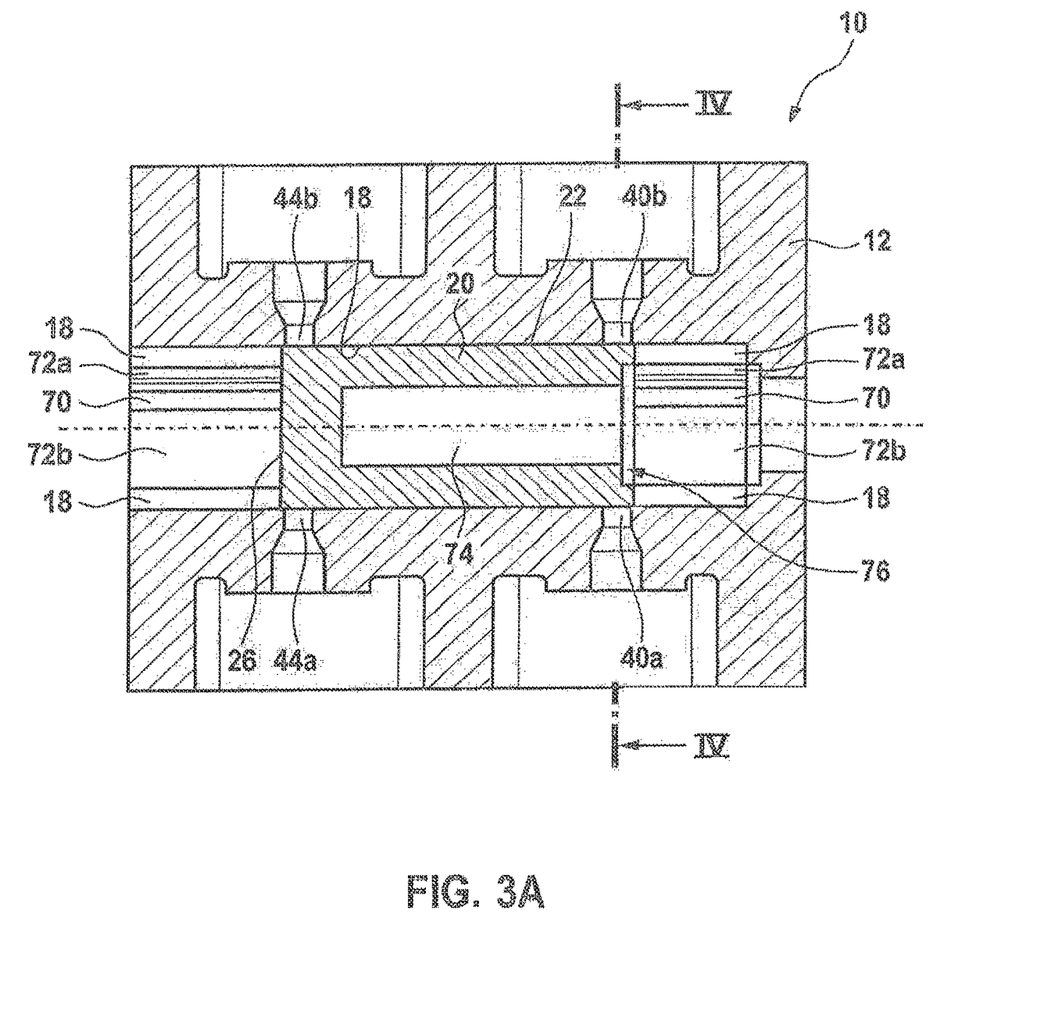
FIG. 3A shows a slide valve in a third specific embodiment in a sectional view.

To seal supply connection 46, return connection 48 and control connection 52, O-ring seals 54 are configured in circumferential grooves on the exterior of slide valve 10. A pressure chamber 56 is bounded, inter alia, by right end face 24 in FIG. 1, whereas a pressure chamber 58 is bounded, inter alia, by left end face 26 in FIG. 1. The two pressure chambers 56 and 58 of slide valve 10 are connected by two axially extending hydraulic channels, as are shown exemplarily in FIGS. 3 and 4. However, the hydraulic channels are not visible in the drawing in FIG. 1, and they are referred to here without reference numerals. Control ports 40a, 40b, 44a and 44b each have a circular cross section. In the present case, slide element 20 is fabricated from a fiberglass reinforced plastic. The majority of the elements of slide valve 10 shown in FIG. 1 essentially have a rotationally symmetric design.

The operation of slide valve 10 is described in the following: To adjust a specific pressure level at control connection 52, electromagnetic actuation device 36 is energized in a specific manner, coupling pin 30 pressing with a predetermined force toward slide element 20 (arrow 64 in FIG. 1). Counteracting the same is the force of compression spring 28 on end face 24. Due to the connection provided by the hydraulic channels, essentially the same pressure prevails in both pressure chambers 56 and 58; thus, slide element 20 is substantially pressure-compensated.

If the pressure at control connection 52 drops, the pressure prevailing in pressure chamber 58 and the hydraulic force at coupling pin 30 (arrow 66) acting equidirectionally with compression spring 28 also drop correspondingly. Slide element 20 in FIG. 1 is hereby moved to the right, whereby the two control ports 44a and 44b approach control edge 27 assigned thereto or even emerge therefrom, allowing an intensified flow of pressurized hydraulic fluid into pressure chamber 58. Thus, the pressure rises in pressure chamber 58 and, via the hydraulic channels, also in pressure chamber 56, and, correspondingly, also in control connection 52.

Slide element 20 thereby forms a pressure regulator, automatically ensuring that a predetermined pressure level is adjusted at control connection 52 in accordance with the current being supplied to electromagnetic actuation device 36. A too high pressure at control connection 52 is reduced by a corresponding displacement of slide element 20 in FIG. 1 to the left, and by a flowing off of the hydraulic fluid to return connection 48. This is likewise achieved in that control edge 25 approaches control ports 40a and 40b or even releases the same in response to a movement of slide element 20 to the left.

In the case of illustrated slide valve 10, leakage into control ports 40a and 40b from pressure chamber 56 and from control orifices 44a and 44b into pressure chamber 58 caused by the guide play is relatively minor. A reason for this is the relatively high precision to which slide element 20 is produced.

In the present case, slide element 20 was injection-molded using three casting molds of an injection mold, the first and the second casting mold being designed as two elements of an axially cut hollow cylindrical body, and the third casting mold as a punch that axially bounds the hollow cylindrical body. Slide element 20 is injection-molded using two injection points configured symmetrically at axial end faces 24 and 26. Compression springs 21 feature axially extending binding seams 88. This is explained in greater detail further below with reference to FIG. 8.

Figure 2:
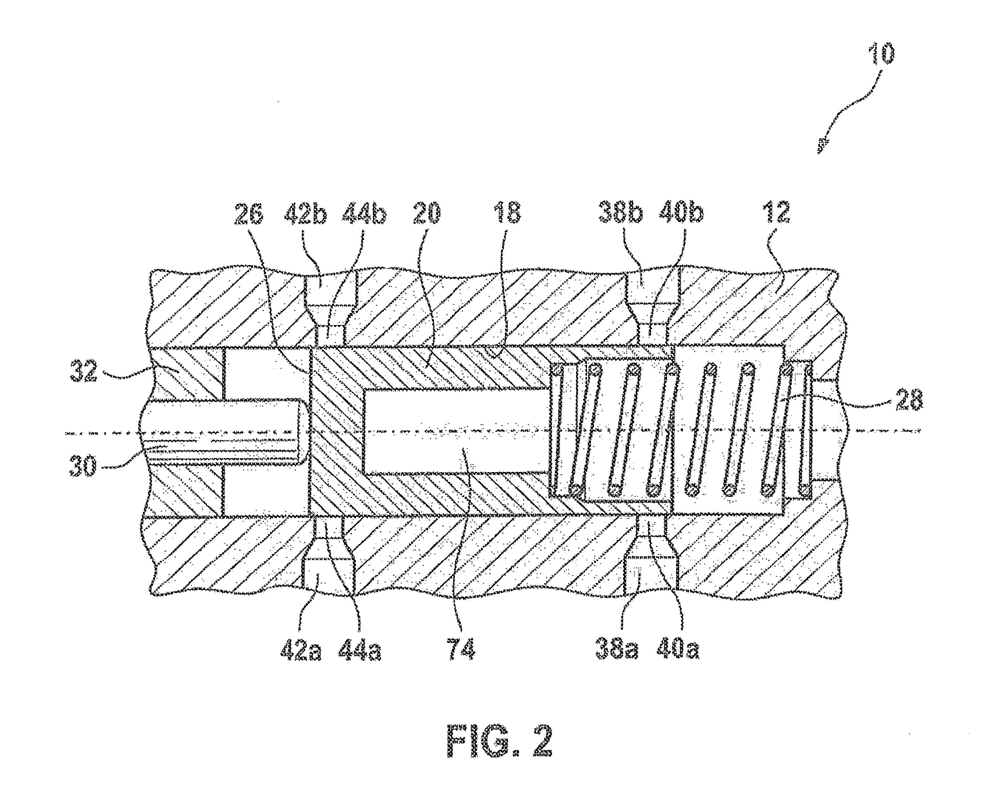
FIG. 2 shows a slide valve in a second specific embodiment in a part-sectional view.

In excerpted form, FIG. 2 shows a sectional view of another specific embodiment of slide valve 10, respectively of slide element 20. In the present case, slide element 20 features a centrical, axial cylindrical recess 74.

FIG. 3A shows a sectional view of a slide valve 10 in a specific embodiment similar to FIG. 1. In addition, slide valve 10 according to FIG. 3A features an axially extending rib 70 ("guide rib"). Coupling pin 30, as well as compression spring 28 are not shown in the drawing of FIG. 3.

Guide surface 18 of housing 12 features an axially extending groove 72, which, in the specific embodiment of FIG. 3A, is subdivided by rib 70 into a first groove 72a in the upper region and a second groove 72b in the lower region of the drawing. It is also discernible that slide element 20 has a blind hole-type, centrical cylindrical recess 74. An annular recess 76, capable of receiving an end section of compression spring 28, is configured in the right region of slide element 20 in the drawing of FIG. 3A.

Figure 3B:
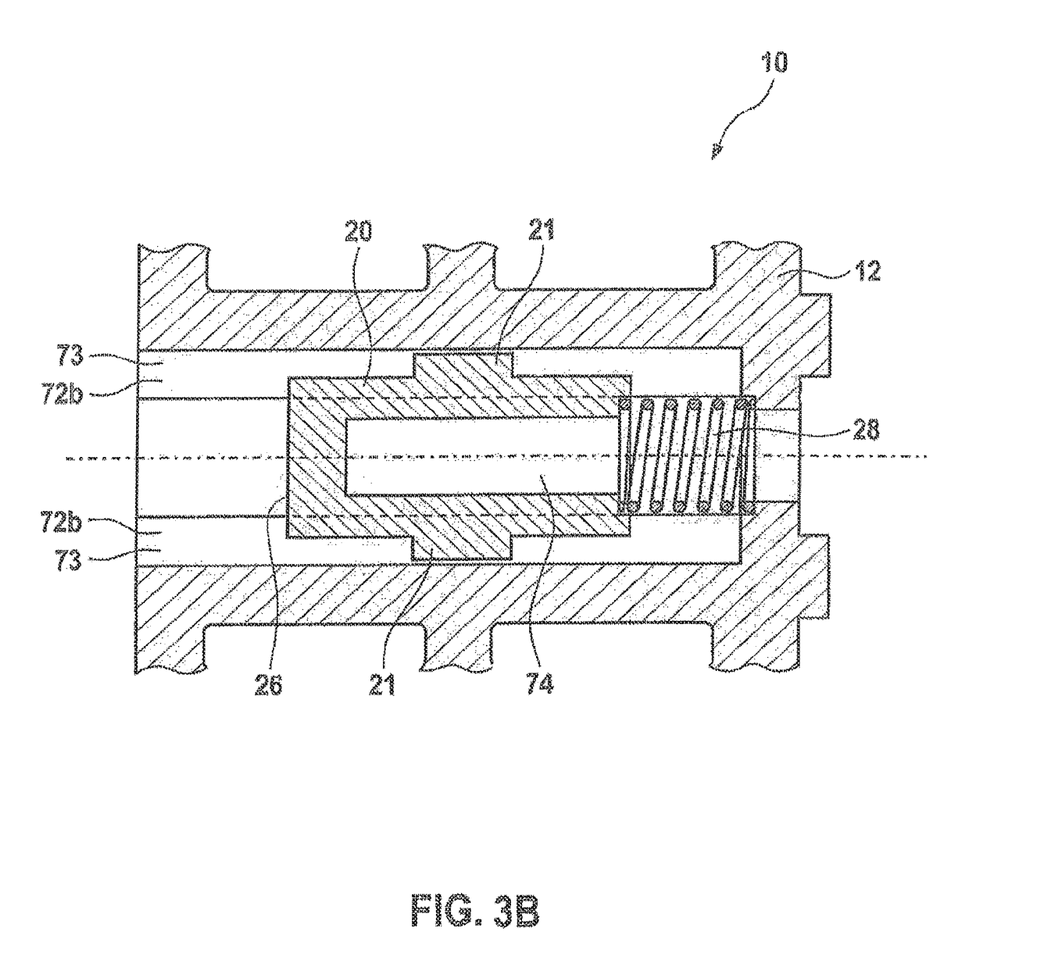
FIG. 3B shows the slide valve from FIG. 3A having a 90° rotated sectional plane.

FIG. 3B shows slide valve 10 of FIG. 3A in a sectional view having a sectional plane that is 90° rotated relative to FIG. 3A.

Figure 4:
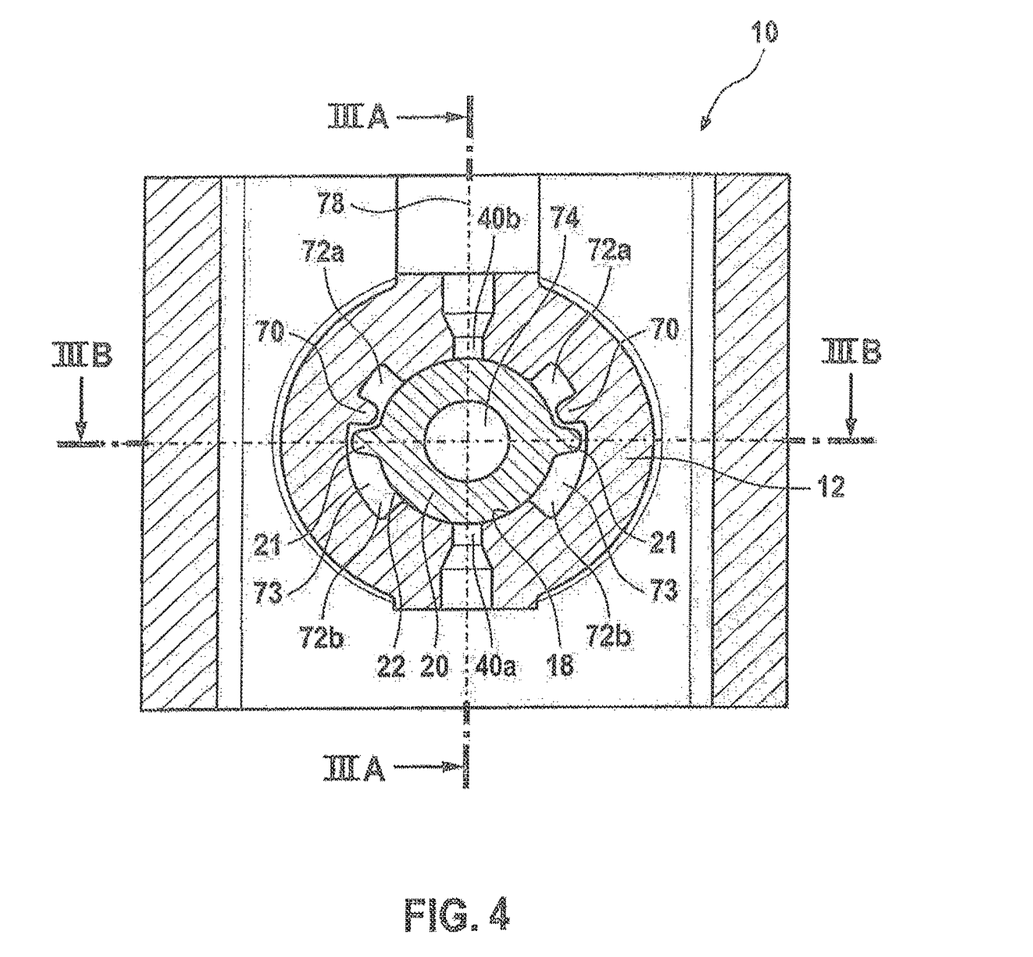
FIG. 4 shows the slide valve from FIG. 3A in an axial sectional view IV.

FIG. 4 shows a sectional view of FIG. 3A in the direction of a line IV-IV. Rib 70 and groove 72, respectively 72a and 72b are very readily discernible in this view. Slide element 20 and portions of guide surface 18, respectively of housing 12 surrounding slide element 20 are mirror-inverted relative to axis 78 (vertically). Together, grooves 72a and 72b constitute one of two hydraulic channels 73 ("overflow channels") required for operation of slide valve 10 through which fuel may flow axially along slide element 20. It is also discernible from FIG. 4 that control orifices 40a, 40b, 44a and 44b extend only via a limited distance in the circumferential direction of guide surface 18, namely the diameter of control orifices 40a, 40b, 44a and 44b. Control ports 40a, 40b, 44a and 44b are radially configured to feature an angle of approximately 90° relative to tongues 21.

Figure 5:
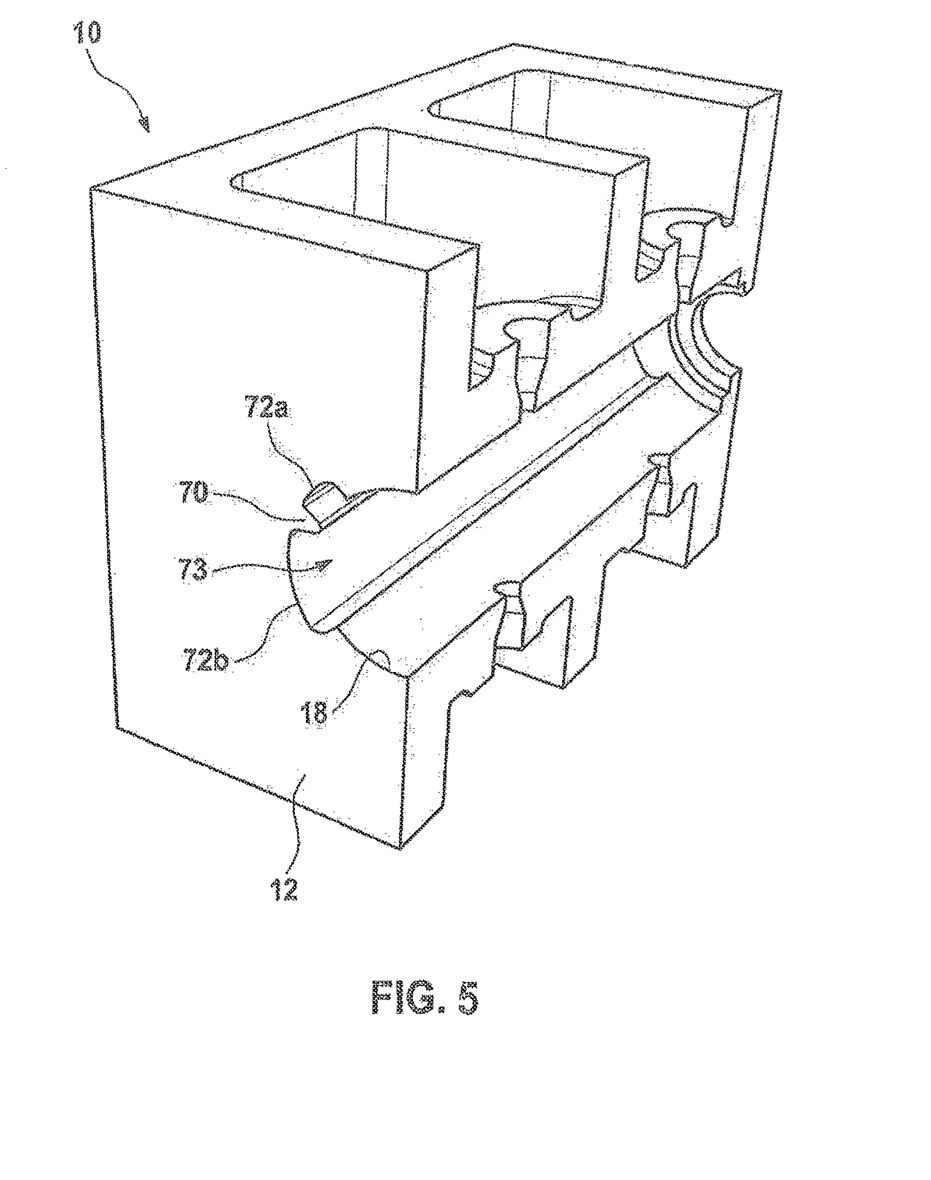
FIG. 5 shows a perspective representation of the slide valve from FIG. 3A.

FIG. 5 shows a perspective view of slide valve 10 of FIGS. 3A, 3B and 4.

Figure 6A:
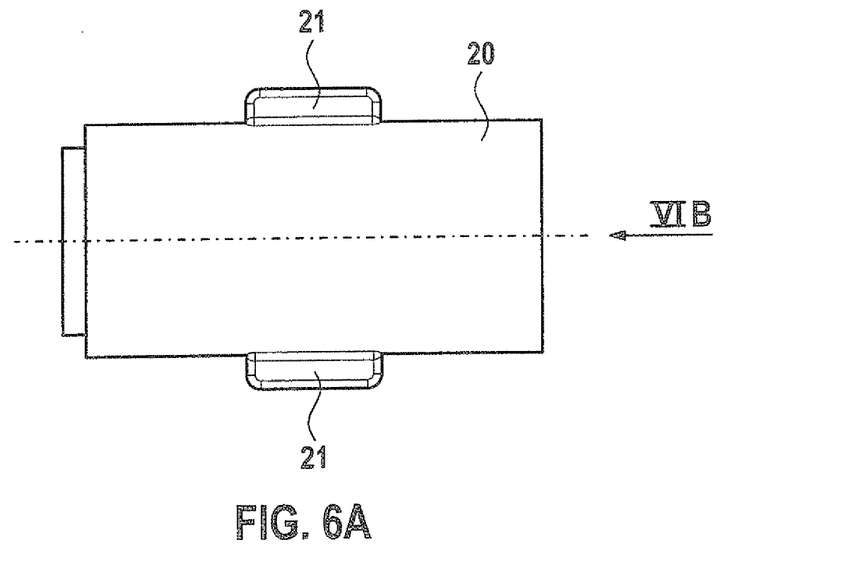
FIG. 6A shows a first view of a slide element similar to that from FIG. 3A.

FIG. 6A shows a view of slide element 20 similar to that of FIG. 3 through 5, the view of FIG. 6A being selected in such a way that both tongues 21 are visible on slide element 20. Tongues 21 are rigidly joined to slide element 20; they may be produced in one piece with slide element 20.

Figure 6B:
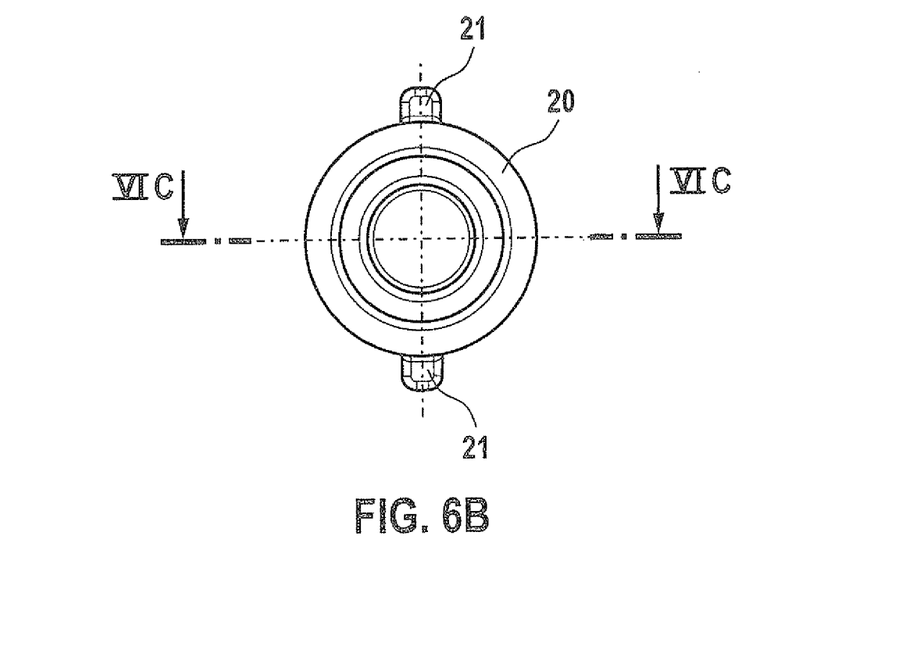
FIG. 6B shows a second view of the slide element from FIG. 6A.

FIG. 6B shows a view VIB of FIG. 6A.

Figure 6C:
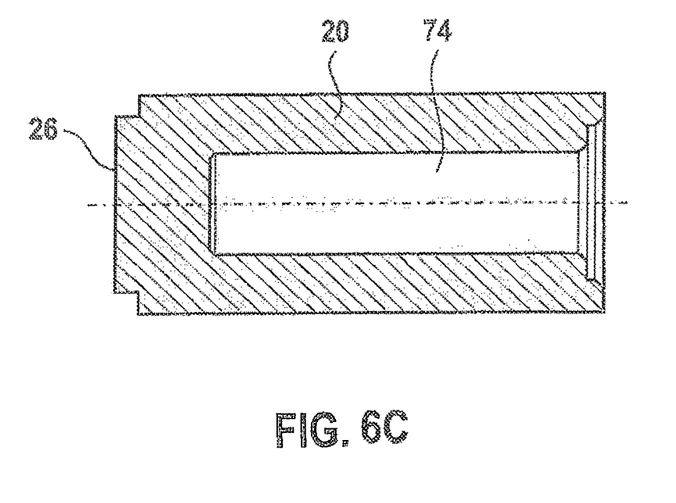
FIG. 6C shows an axial longitudinal section of the slide element from FIG. 6A.

FIG. 6C shows a view along a line VIC-VIC of FIG. 6B.

Figure 7:
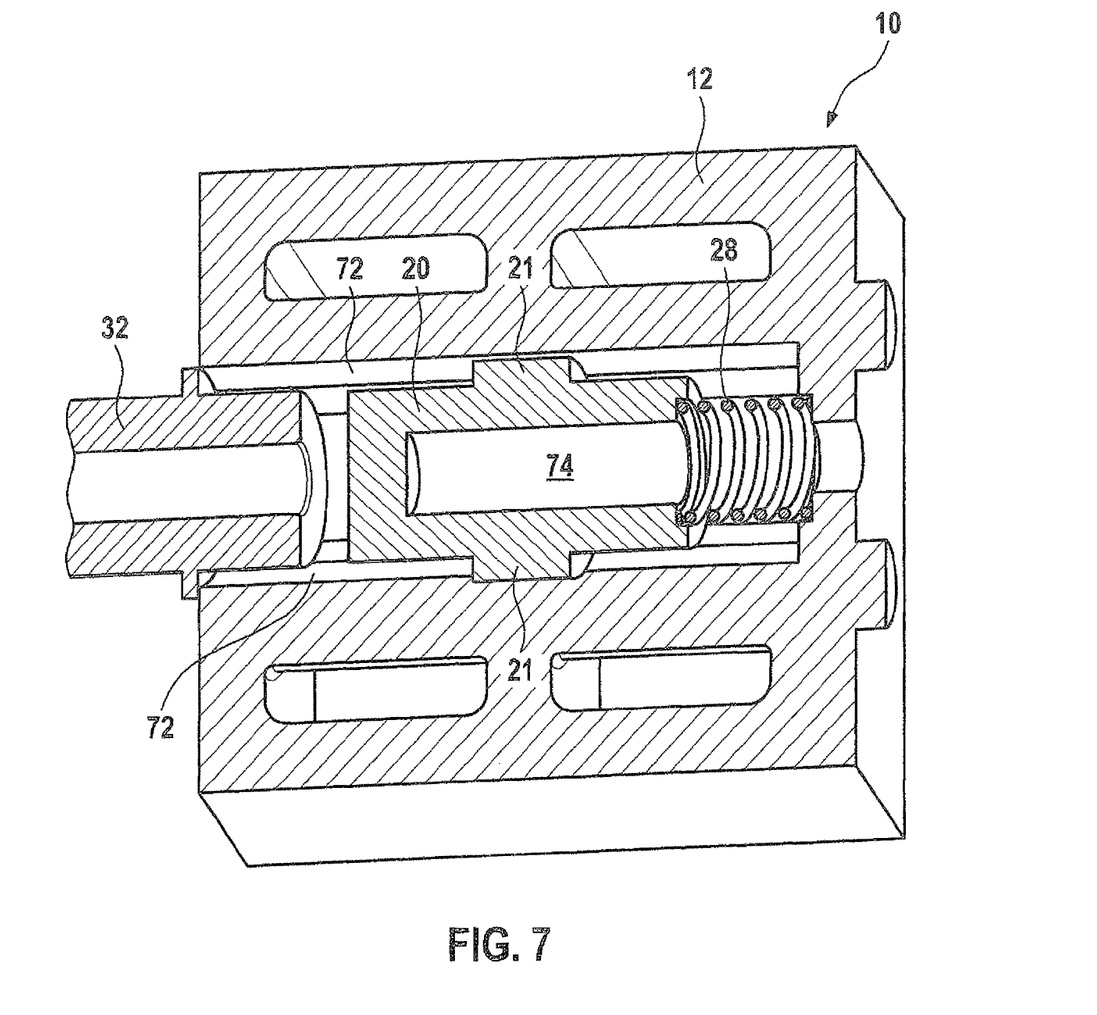
FIG. 7 shows a perspective representation of a sectional view of a slide valve similar to that from FIG. 3B.

FIG. 7 shows a perspective view of slide valve 10 similar to slide valve 10 according to FIG. 3b in a part-sectional view. For the sake of better clarity, sectional planes of slide element 20 and of guide piece 32 deviate slightly from sectional plane of housing 12 in the present case.

It is discernible that slide element 20 of FIG. 7 is axially displaceable (in the drawing, horizontally). Tongues 21, which are radially guided in grooves 72, prevent slide element 20 from being able to rotate about the longitudinal axis. A corresponding radial portion of peripheral surface 22 of slide element 20 is thereby always essentially facing a corresponding control ports 40a and 40b, respectively 44a and 44b. FIG. 7 shows tongues 21, however, not control ports 40a and 40b. FIG. 3A shows control ports 40a and 40b, however, not tongues 21.

Figure 8:
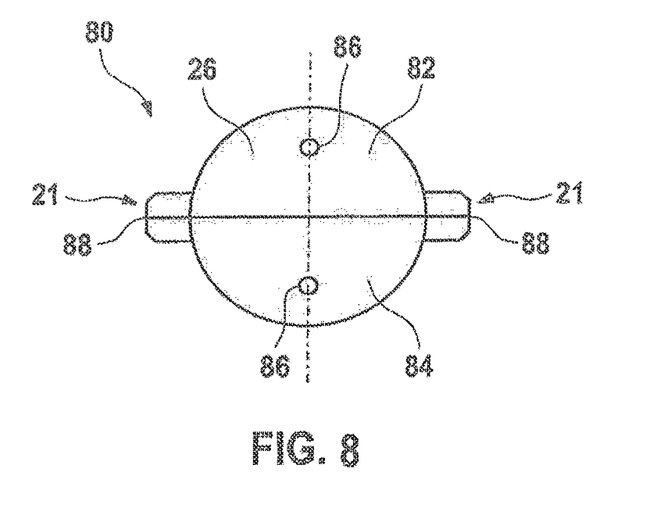
FIG. 8 shows a schematic representation of an injection mold having two injection points.

FIG. 8 shows a simplified schematic representation of a specific embodiment of an injection mold 80, two end face-side injection points 86 being configured mutually symmetrically. Two injection points 86 may be configured at both end faces 24 and 26 of slide element 20, respectively. This permits a greater precision of finished slide element 20 at regions of peripheral surface 22, as well as of control edges 25 and 27 that are radially distal from binding seam 88, thus at those regions that come in contact with control ports 40a, 40b, 44a and 44b during operation of slide valve 10. The improved geometric properties are also obtained by the longitudinal orientation of the reinforcing fibers that arises during plastic injection molding.

What is claimed is:

1. A slide valve, comprising:
   a housing;
   a slide element guided within the housing;
   at least two hydraulic connections on the housing, at least one of the hydraulic connections communicating hydraulically with at least one control port in a cylindrical guide surface that guides the slide element;
   wherein the control port extends only over a limited distance in a circumferential direction of the guide surface and cooperating with a control edge of the slide element assigned thereto,
   wherein the slide element has a cylindrical outer contour and at least one end face, wherein the slide element is produced by injection molding,
   wherein at least one injection point is configured on the end face of the slide element,
   wherein the slide valve includes a limiting arrangement to limit a rotation of the slide element relative to the housing, and
   wherein the limiting arrangement includes at least one guide device in accordance with a configuration of a tongue and a groove, and wherein a radial angle of the groove is equal to or greater than a radial angle of the tongue guided in the groove.

2. The slide valve of claim 1, wherein the slide element has at least one axially extending tongue, and wherein the guide device, respectively the housing, has at least one axially extending groove.

3. The slide valve of claim 2, wherein the groove is a radial portion of an axially extending hydraulic channel.

4. The slide valve of claim 2, wherein the groove is formed at least at one of two axially extending bounding surfaces by an axially extending rib of the guide surface, respectively of the housing.

5. The slide valve of claim 2, wherein the slide element has two 180° radially, mutually offset tongues, the first tongue cooperating with the corresponding groove to limit a clockwise rotation of the slide element, and the second tongue cooperating with the corresponding groove to limit a counterclockwise rotation of the slide element.

6. The slide valve of claim 1, wherein at least one of the slide element and the guide surface, respectively the housing, are fabricated from at least one of, a reinforced plastic, and a fiberglass reinforced plastic.

7. The slide valve of claim 1, wherein the slide valve is a pressure regulating valve for an automatic transmission of a motor vehicle.

8. A method for manufacturing a slide valve, the method comprising:
   injection molding a slide element using at least one injection point configured on at least one end face of the slide element;
   wherein the slide valve, includes:
      a housing;
      the slide element, which is guided within the housing; at least two hydraulic connections on the housing, at least one of the hydraulic connections communicating hydraulically with at least one control port in a cylindrical guide surface that guides the slide element;
   wherein the control port extends only over a limited distance in a circumferential direction of the guide surface and cooperating with a control edge of the slide element assigned thereto,
   wherein the slide element has a cylindrical outer contour and the at least one end face,
   wherein the slide valve includes a limiting arrangement to limit a rotation of the slide element relative to the housing, and
   wherein the limiting arrangement includes at least one guide device in accordance with a configuration of a tongue and a groove, and wherein a radial angle of the groove is equal to or greater than a radial angle of the tongue guided in the groove.

9. The method of claim 8, wherein the slide element is injection-molded using two injection points configured symmetrically at the axial end face thereof.

10. The method of claim 8, wherein binding seams, which form during injection molding of the slide element on a peripheral surface thereof, are formed outside of a region of the at least one control port.

* * * * *